United States Patent
Tsukamoto et al.

(10) Patent No.: US 7,205,761 B2
(45) Date of Patent: Apr. 17, 2007

(54) ROTATION STATE DETECTING DEVICE AND ROTATION STATE DETECTING METHOD

(75) Inventors: Manabu Tsukamoto, Tokyo (JP); Takaaki Murakami, Tokyo (JP); Yuji Ariyoshi, Tokyo (JP); Takahiro Ohnakado, Tokyo (JP); Yasuhiro Kosasayama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 256 days.

(21) Appl. No.: 11/076,874

(22) Filed: Mar. 11, 2005

(65) Prior Publication Data

US 2005/0206371 A1    Sep. 22, 2005

(30) Foreign Application Priority Data

Mar. 17, 2004    (JP) .............................. 2004-076595

(51) Int. Cl.
*G01P 3/44* (2006.01)
*G01B 7/30* (2006.01)
*G08B 21/00* (2006.01)

(52) U.S. Cl. ................. 324/179; 324/173; 324/207.25; 340/672

(58) Field of Classification Search ........... 324/207.13, 324/207.15, 207.2, 207.21, 207.25, 160, 324/163, 165, 166, 173, 174, 178–180; 340/671, 340/672; 73/514.39
See application file for complete search history.

(56) References Cited

U.S. PATENT DOCUMENTS 3,728,565 A * 4/1973 O'Callaghan ............... 310/168
4,142,152 A * 2/1979 Fincher ....................... 324/165
4,274,053 A   6/1981 Ito et al.
4,331,917 A * 5/1982 Render et al. .............. 324/166
5,869,962 A   2/1999 Kasumi et al.
5,880,586 A * 3/1999 Dukart et al. ............ 324/207.2

(Continued)

FOREIGN PATENT DOCUMENTS

| DE | 29 08 599 A1 | 9/1979 |
| DE | 31 26 806 A1 | 1/1983 |
| DE | 196 14 165 A1 | 10/1996 |
| JP | 2000-337922 | 12/2000 |
| JP | 2001-108700 | 4/2001 |

*Primary Examiner*—Edward Lefkowitz
*Assistant Examiner*—Kenneth J. Whittington
(74) *Attorney, Agent, or Firm*—Oblon, Spivak, McClelland, Maier & Neustadt, P.C.

(57) ABSTRACT

A rotation state detecting device capable of detecting the direction of rotation of a rotating body includes first and second bridge circuits made up of magneto-resistance effect elements, a first comparator for detecting the increasing/decreasing direction of the center point voltage of the first bridge circuit, a second comparator for detecting the increasing/decreasing direction of the center point voltage of the second bridge circuit, a third comparator for detecting the difference between the center point voltage of the first bridge circuit and the center point voltage of the second bridge circuit, and logic value information deriving means for outputting "1" when the logic values of the outputs of the first comparator and the second comparator are both "1", outputting "0" when they are both "0", and continuing to output the previous value at other times, the direction of rotation of the rotating body being determined on the basis of a combination of the outputs of the first, second and third comparators and the logic value information deriving means.

6 Claims, 6 Drawing Sheets

U.S. PATENT DOCUMENTS

| | | | |
|---|---|---|---|
| 6,232,739 B1 * | 5/2001 | Krefta et al. | 318/652 |
| 6,310,474 B1 * | 10/2001 | Schroeder | 324/207.25 |
| 6,750,784 B2 * | 6/2004 | Jacobsen | 340/870.05 |
| 6,844,723 B2 * | 1/2005 | Shirai et al. | 324/207.25 |
| 2005/0007103 A1 * | 1/2005 | Schroeder et al. | 324/207.25 |
| 2005/0156591 A1 * | 7/2005 | Wan et al. | 324/207.21 |

* cited by examiner

| MODE | INCREASING/ DECREASING 41 | INCREASING/ DECREASING 42 | DIFFERENCE 43 | LOGIC 54 | ROTATION |
|---|---|---|---|---|---|
| D | 0 | 0 | 0 | - | FORWARD |
| G | 0 | 0 | 1 | - | BACKWARD |
| H | 0 | 1 | - | 0 | BACKWARD |
| C | 0 | 1 | - | 1 | FORWARD |
| A | 1 | 0 | - | 0 | FORWARD |
| F | 1 | 0 | - | 1 | BACKWARD |
| E | 1 | 1 | 0 | - | BACKWARD |
| B | 1 | 1 | 1 | - | FORWARD |

ROTATION STATE DETECTING DEVICE AND ROTATION STATE DETECTING METHOD

BACKGROUND OF THE INVENTION

1. Field of the Invention

This invention relates to a rotation state detecting device and a rotation state detecting method for detecting the rotation state of a pronged magnetic rotating body.

2. Description of the Related Art

Generally, for example in an engine of an automotive vehicle, to detect the speed of the engine and the ignition timing of multiple cylinders, a revolution sensor is provided. In a revolution sensor, for example as shown in JP-A-2000-337922, 'Rotation Detecting Device', a magnet for directing a bias field at the teeth of a rotating toothed wheel and two magneto-resistance effect element patterns whose resistance values change along with changes in the bias field are provided, the two magneto-resistance effect element patterns are disposed symmetrically about the magnetic center axis of the bias magnet, and changes in the magnetic field caused by rotation of the toothed wheel are outputted as voltages. By the difference between the outputs of the two magneto-resistance effect element patterns being taken, it is intended that offset caused by manufacturing factors and power source fluctuations and noise and the like are canceled out and the rotation is detected accurately.

And in JP-A-2001-108700, 'Rotating Body Reverse Rotation Detecting Device and Reverse Rotation Detecting Method', one pair of magneto-resistance effect element patterns is provided and reverse rotation is detected by an analog threshold level being set.

In a rotation detecting device of the kind shown in JP-A-2000-337922, a speed of rotation is detected by taking the difference between the outputs of two magneto-resistance effect element patterns, and there has been the problem that even if the toothed wheel rotates backward, the output waveform is the same (FIG. 2 of JP-A-2000-337922), and consequently the rotation direction of the toothed wheel cannot be detected. In present engines, when the engine has stopped in the fuel compression stroke, the reaction of the compressed air sometimes causes the crankshaft to rotate backward. With rotation detecting devices of related art, because the rotation direction cannot be detected, even if this kind of backward rotation occurs, the problem may arise that this is detected as forward rotation and consequently the ignition timing of the cylinders is wrong the next time the engine is started.

And in a reverse rotation detecting device according to JP-A-2001-108700, 'Rotating Body Reverse Rotation Detecting Device and Reverse Rotation Detecting Method', it is necessary to set two threshold levels from outside, and there has been the problem that due to dispersion among devices and mounting accuracy issues it has been necessary to adjust each device individually.

SUMMARY OF THE INVENTION

This invention was made to solve the problems described above, and it is an object of the invention to provide a rotation state detecting device and a rotation state detecting method with which it is possible to detect the direction of rotation of a rotating body and with which adjustment for device dispersion and offset and the like is almost unnecessary.

To achieve this object and other objects the invention provides a rotation state detecting device including: a magnet creating a bias field; first and second bridge circuits disposed in the field of the magnet and facing a pronged magnetic rotating body constituting a detection object side by side in the rotation direction thereof, made up of magneto-resistance effect elements that undergo resistance changes caused by state changes of the bias field corresponding to rotation of the detection object; a first comparator for detecting an increasing/decreasing direction of the center point voltage of the first bridge circuit and outputting a corresponding logic value; a second comparator for detecting an increasing/decreasing direction of the center point voltage of the second bridge circuit and outputting a corresponding logic value; a third comparator for detecting a difference between the center point voltage of the first bridge circuit and the center point voltage of the second bridge circuit and outputting a corresponding logic value; and logic value information deriving means for outputting "1" when the logic values of the outputs of the first comparator and the second comparator are both "1", outputting "0" when they are both "0", and continuing to output the previous value at other times, wherein the direction of rotation of the detection object is determined on the basis of a combination of the outputs of the first, second and third comparators and the logic value information deriving means.

The invention also provides a rotation state detecting method wherein the direction of rotation of an object of detection is determined using a rotation state detecting device according to the invention.

With a rotation state detecting device and a rotation state detecting method according to the invention it is possible to detect the direction of rotation of a rotating body, and adjustment for device dispersion and offset and the like is almost unnecessary.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Preferred Embodiment

Figure 1A:
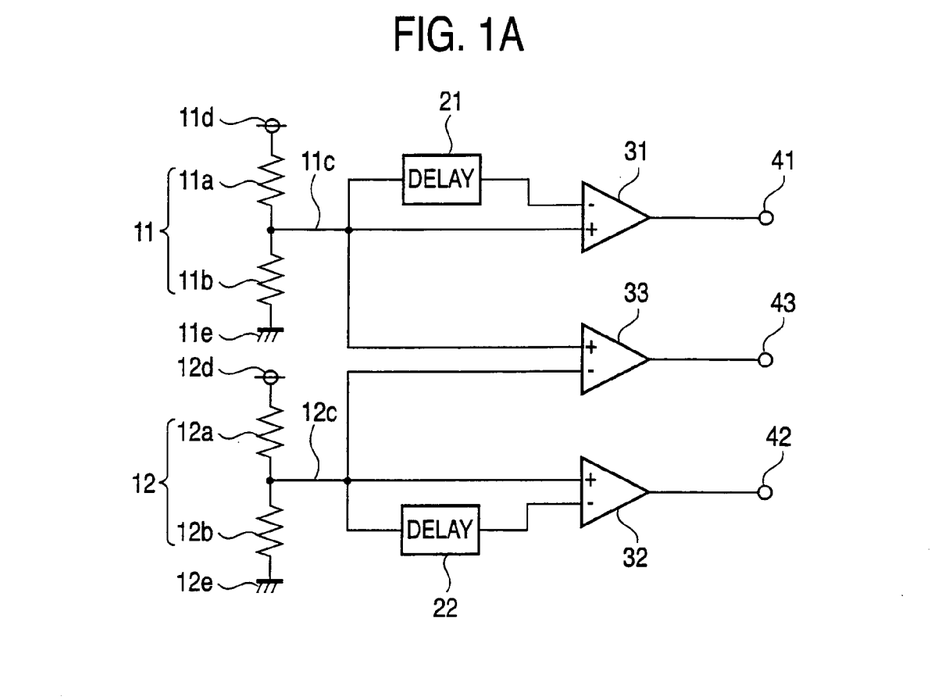
FIGS. 1A and 1B are block diagrams showing main parts of a first preferred embodiment of a rotation state detecting device according to the invention.
Figure 1B:
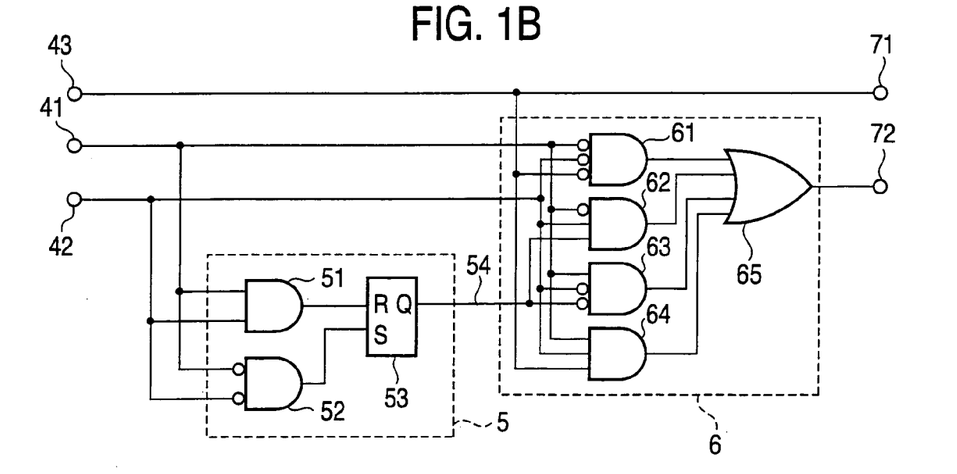
Figure 2A:
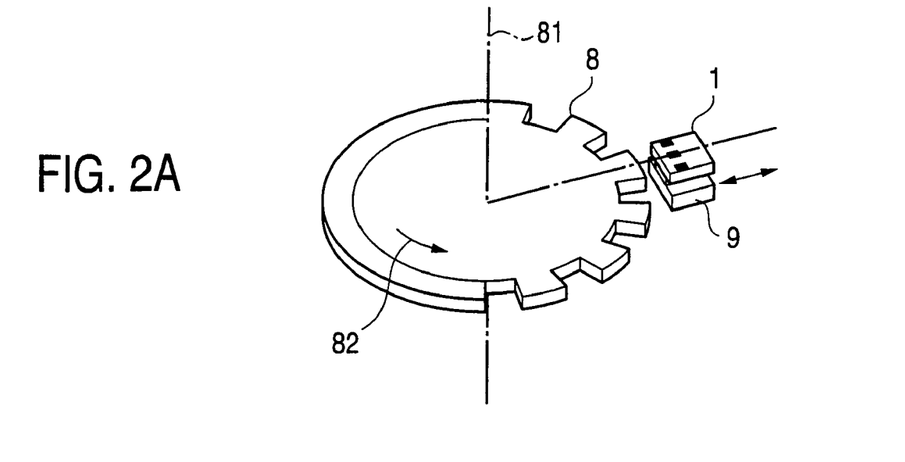
FIGS. 2A to 2C are views illustrating the construction of a magnetic circuit used in the rotation state detecting device of the first preferred embodiment.
Figure 2B:
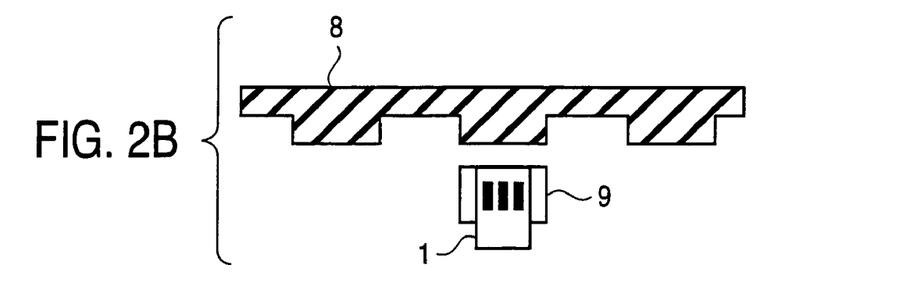
Figure 2C:
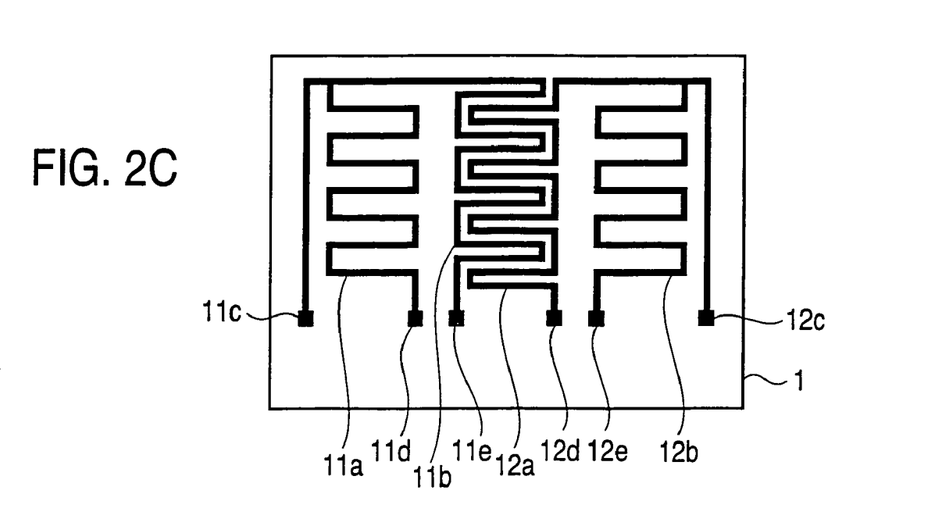

FIGS. 1A and 1B are block diagrams showing main parts of a first preferred embodiment of a rotation state detecting device according to the invention. FIGS. 2A to 2C are views illustrating the construction of a magnetic circuit used in the rotation state detecting device of the first preferred embodiment, FIG. 2A being a perspective view, 2B a plan view and 2C a view of a pattern of magneto-resistance effect elements. In FIGS. 2A to 2C, a magneto-resistance effect element unit 1 is made up of magneto-resistance effect elements 11a, 11b, 12a and 12b. Referring to FIG. 1, the magneto-resistance effect elements 11a, 11b are connected and form a first bridge circuit 11 having a grounded terminal 11e, a terminal lid to which a constant voltage is applied, and a terminal 11c that outputs a center point voltage. Similarly, the magneto-resistance effect elements 12a, 12b are connected and form a second bridge circuit 12 having a grounded terminal 12e, a terminal 12d to which a constant voltage is applied, and a terminal 12c that outputs a center point voltage.

A magnetic rotating body 8 constituting an object of detection is of a pronged or toothed (both of these will be referred to as pronged) shape such that it causes a magnetic field to change. A magnet 9 has is magnetized in the direction of the axis of rotation 81 of the pronged magnetic rotating body 8 and is disposed facing the pronged magnetic rotating body 8 across a gap so as to create a bias field. The magneto-resistance effect element unit 1 is disposed with a predetermined gap between itself and the magnet 9 and facing the pronged magnetic rotating body 8 with a predetermined gap therebetween in the radial direction. As shown in FIG. 2C, the first bridge circuit 11 and the second bridge circuit 12 constituting the magneto-resistance effect element unit 1 are disposed side by side in the rotation direction 82 of the pronged magnetic rotating body 8. In this first preferred embodiment, the magneto-resistance effect elements are arranged side by side in the order 11a, 11b, 12a, 12b in the rotation direction 82 of the pronged magnetic rotating body 8. FIG. 2B shows the periphery of the pronged magnetic rotating body 8 developed along a straight line.

In FIG. 1A, in the first and second bridges 11, 12, depending on the strength of the magnetic field impressed upon each of them, the resistance values of the magneto-resistance effect elements 11a, 11b, 12a and 12b constituting them change. And as a result of the resistance values changing, the center point voltages of the first and second bridges 11, 12 (the voltages of the terminals 11c, 12c; hereinafter these voltages will be indicated with the same reference numerals as the terminals) also change. Delaying circuits 21, 22 delay the center point voltages 11c, 12c for a predetermined time. Comparators 31, 32 detect the increasing/decreasing directions of the center point voltages 11c, 12c by comparing the center point voltages 11c, 12c with the outputs of the respective delaying circuits 21, 22 and output corresponding logic values to output terminals 41, 42.

A comparator 33 takes the differential between the center point voltages 11c, 12c of the first and second bridges 11, 12 and outputs a logic value based on the sign of that differential to an output terminal 43. The speed of the magnetic rotating body 8 can be detected from the number of outputs from the output terminal 43 per unit time.

In FIG. 1B, input side terminals 41, 42 and 43 are connected to the output terminals 41, 42 and 43 of FIG. 1A. A logic circuit 5 is logic information deriving means and is made up of an AND circuit 51, a NOR circuit 52 and an RS flip-flop 53 and outputs a logic value to an output terminal 54. The circles of the NOR circuit 52 symbol are invertors (inverting circuits). A gate circuit 6 is made up of circuits 61, 62, 63 and 64 and an OR circuit 65, and outputs a logic value to an output terminal 72. The circles of the symbols of the circuits 61, 62 and 63 are invertors (inverting circuits). A logic value showing the rotation direction of the pronged magnetic rotating body 8 constituting the object of detection is outputted from the output terminal 72, and its speed is detected through an output terminal 71.

Figure 3A:
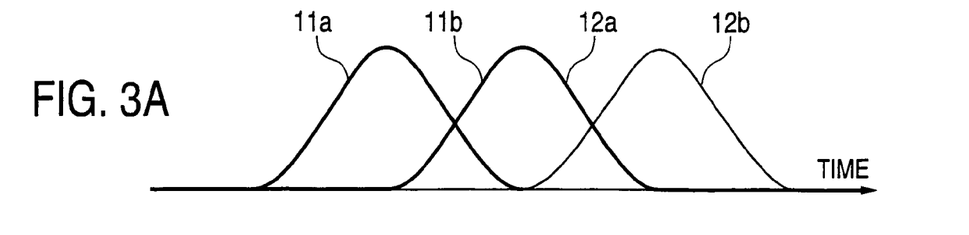
FIGS. 3A and 3B are views illustrating changes in the resistance values of magneto-resistance effect elements and changes in the center point voltages of bridge circuits used in the rotation state detecting device of the first preferred embodiment.

The operation of the device will now be described, with reference to FIG. 1A through FIG. 5. When the pronged magnetic rotating body 8 rotates, the magnetic field impressed on the magneto-resistance effect element unit 1 changes, and the resistance values of the magneto-resistance effect elements 11a, 11b, 12a and 12b change. The changes in resistance values of the magneto-resistance effect elements 11a, 11b, 12a and 12b are maximum when they are nearest to the center of a tooth of the pronged magnetic rotating body 8 facing them. Because the magneto-resistance effect elements 11a, 11b and the magneto-resistance effect elements 12a, 12b are disposed with predetermined gaps between them in the rotation direction, the times at which the change in their resistance values is maximum are different, as shown in FIG. 3A. Consequently, the voltage waveforms of the center point voltages 11c, 12c are waveforms of the kind shown in FIG. 3B. (In FIG. 3A, the resistance values of the magneto-resistance effect elements 11a, 11b, 12a and 12b are indicated with the same reference numerals as the devices themselves.)

Figure 3B:
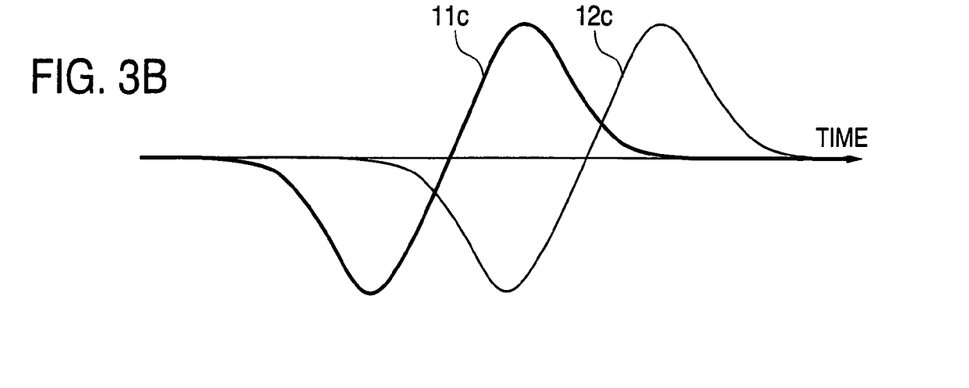
Figure 4:
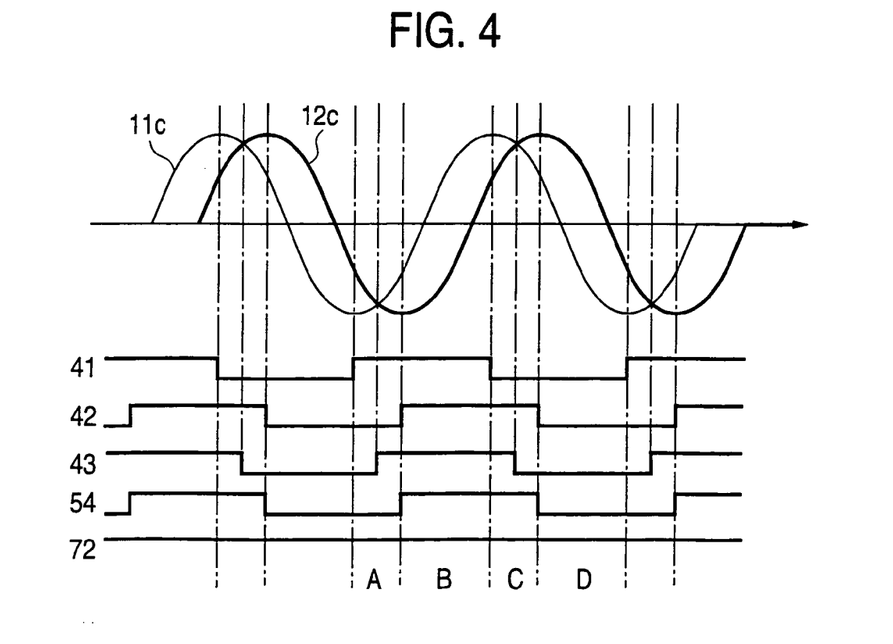
FIG. 4 is a waveform chart showing the outputs of output terminals when a magnetic rotating body is rotating forward in the first preferred embodiment.
Figure 5:
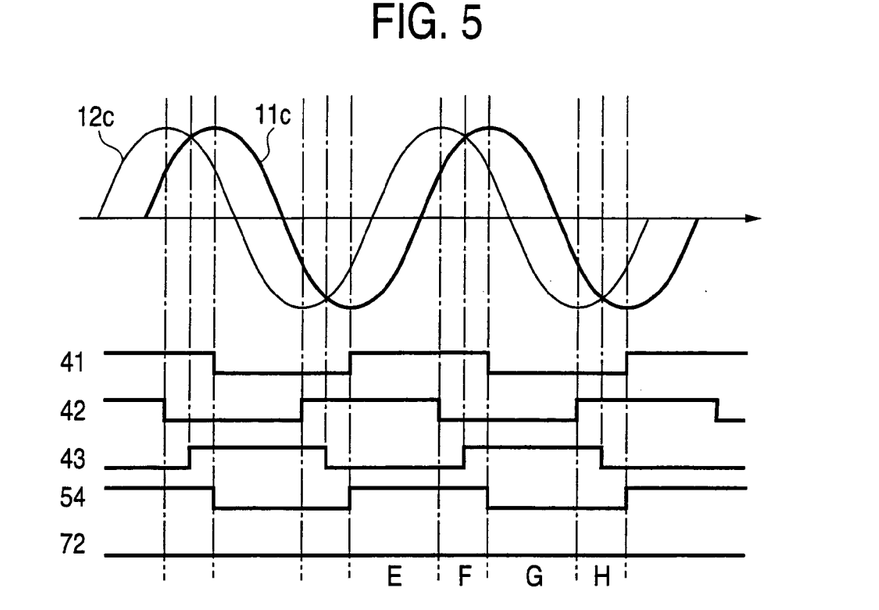
FIG. 5 is a waveform chart showing the outputs of the output terminals when the magnetic rotating body is rotating backward in the first preferred embodiment.

Whereas in FIG. 3 a case was explained in which one tooth of the pronged magnetic rotating body 8 passes, in the case of successive teeth illustrated in FIG. 2A, the corresponding voltage waveform is a continuous waveform of a kind shown in FIG. 4 or FIG. 5. Here, FIG. 4 shows a case in which the pronged magnetic rotating body 8 is rotating forward (in the direction of the arrow 82 shown in FIG. 2A), and FIG. 5 a case in which the pronged magnetic rotating body 8 is rotating backward. When the pronged magnetic rotating body 8 is rotating forward, as shown in FIG. 4, the center point voltage 12c of the second bridge circuit 12 lags in phase behind the center point voltage 11c of the first bridge circuit 11. Consequently, the logic value outputs of the increasing/decreasing directions of the center point voltages 11c, 12c of the first and second bridge circuits 11, 12 (the logic value outputs of the comparators 31, 32, which are the logic value outputs of the output terminals 41, 42) assume the kind of waveforms shown in FIG. 4. The logic value output of the difference between the center point voltages 11c, 12c of the first and second bridge circuits 11, 12 (the logic value output of the comparator 33, which is the logic value output of the output terminal 43), is as shown in FIG. 4. (The logic value outputs of the output terminals 41, 42 and 43 are also indicated with the same reference numerals as the terminals themselves.)

And in the case of the pronged magnetic rotating body 8 rotating backward, as shown in FIG. 5, the center point voltage 11c of the first bridge circuit 11 lags in phase behind the center point voltage 12c of the second bridge circuit 12. Consequently, the logic value outputs 41, 42 of the increasing/decreasing directions of the center point voltages 11c, 12c of the first and second bridges 11, 12 assume the kinds of waveform shown in FIG. 5. The logic value output 43 of the difference between the center point voltages 11c, 12c of the first and second bridge circuits 11, 12 is as shown in FIG. 5.

The logic value output of the logic circuit (logic information deriving means) 5 (the output of the output terminal 54) is "1" when the logic value outputs (the outputs of the comparators 31, 32) 41, 42 of the increasing/decreasing direction of the center point voltages 11c, 12c are both "1", is "0" when they are both "0", and at other times holds the previous value. The waveform of the logic value output of the logic circuit (logic information deriving means) 5 during forward rotation is shown in FIG. 4 and during backward rotation is shown in FIG. 5. (The logic value output of the output terminal 54 is also indicated with the same reference numeral as the terminal itself.)

Figure 8:
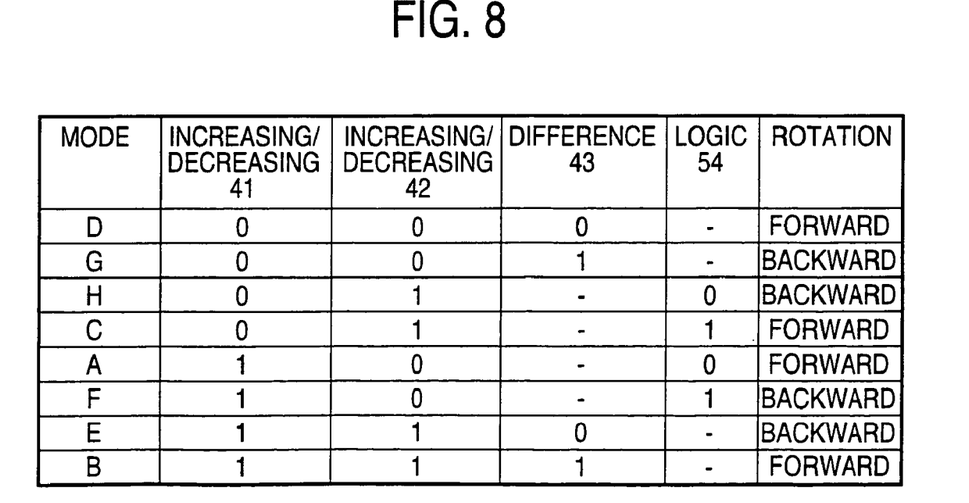
FIG. 8 is a truth value table classifying operating states in the first preferred embodiment.

When from the logic value outputs of increasing/decreasing direction (the outputs of the comparators 31, 32) 41, 42, the logic value output of the difference (the output of the comparator 33) 43, and the logic value output 54 of the logic circuit 5 (the output of the output terminal 54) the different operating states are classified, a truth value table of the kind shown in FIG. 8 is obtained.

This truth value table will now be explained with reference to FIG. 4 and FIG. 5. When the center point voltage 11c has increased (the output of the output terminal 41 is "1") and the center point voltage 12c has decreased (the output of the output terminal 42 is "0"), reference is made to the output of the output terminal 54, and if it is "0" then forward rotation (Mode "A") is inferred and if it is "1" then backward rotation (Mode "F") is inferred.

When the center point voltage 11c has increased (the output of the output terminal 41 is "1") and the center point voltage 12c has increased (the output of the output terminal 42 is "1"), reference is made to the output of the output terminal 43, and if it is "1" then forward rotation (Mode "B") is inferred and if it is "0" then backward rotation (Mode "E") is inferred.

Similarly, when the center point voltage 11c has decreased (the output of the output terminal 41 is "0") and the center point voltage 12c has increased (the output of the output terminal 42 is "1"), reference is made to the output of the output terminal 54, and if it is "1" then forward rotation (Mode "C") is inferred and if it is "1" then backward rotation (Mode "H") is inferred.

When the center point voltage 11c has decreased (the output of the output terminal 41 is "0") and the center point voltage 12c has decreased (the output of the output terminal 42 is "0"), reference is made to the output of the output terminal 43, and if it is "0" then forward rotation (Mode "D") is inferred and if it is "1" then backward rotation (Mode "G") is inferred.

In this way, in each of the cases of increasing/decreasing of the center point voltages 11c, 12c (the outputs of the output terminals 41, 42), by referring to the output of the output terminal 43 or the output of the output terminal 54, it is possible to specify forward rotation or backward rotation. The gate circuit 6 shown in FIG. 1B is an example of a circuit for realizing this truth value table. In the case of forward rotation "1" is outputted to the output terminal 72, and in the case of backward rotation "0" is outputted to the output terminal 72.

Next, the operation in a case where the pronged magnetic rotating body 8 has shifted from forward rotation to backward rotation will be described, with reference to FIG. 6 and FIG. 7. Because in the case of a shift from forward rotation to backward rotation the operation differs depending on the location of the reversal, the cases of shifting to backward rotation in Mode "A" and Mode "B" of FIG. 4 will be explained as a representative examples.

Figure 6:
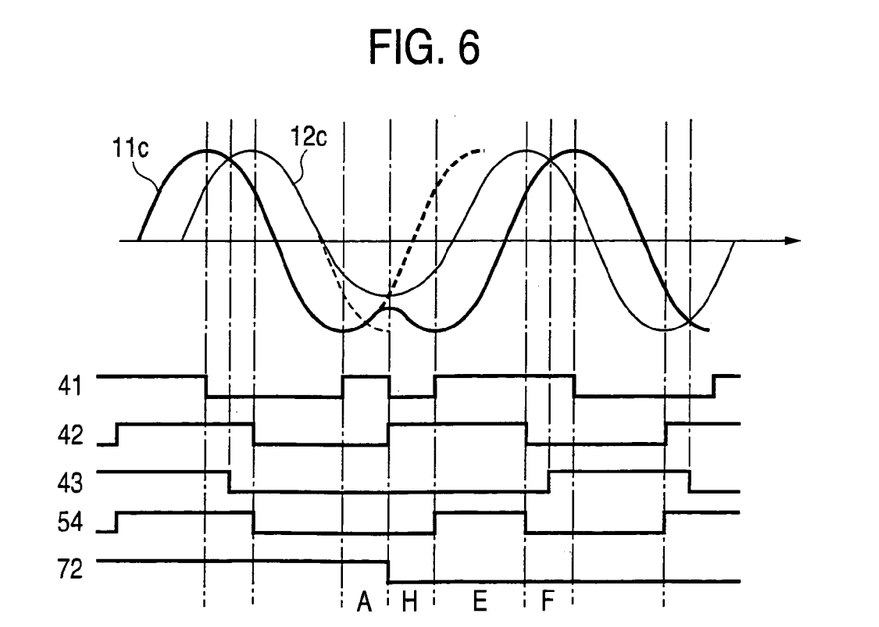
FIG. 6 is a waveform chart showing the outputs of the output terminals when the magnetic rotating body has shifted from forward rotation to backward rotation in the first preferred embodiment.
Figure 7:
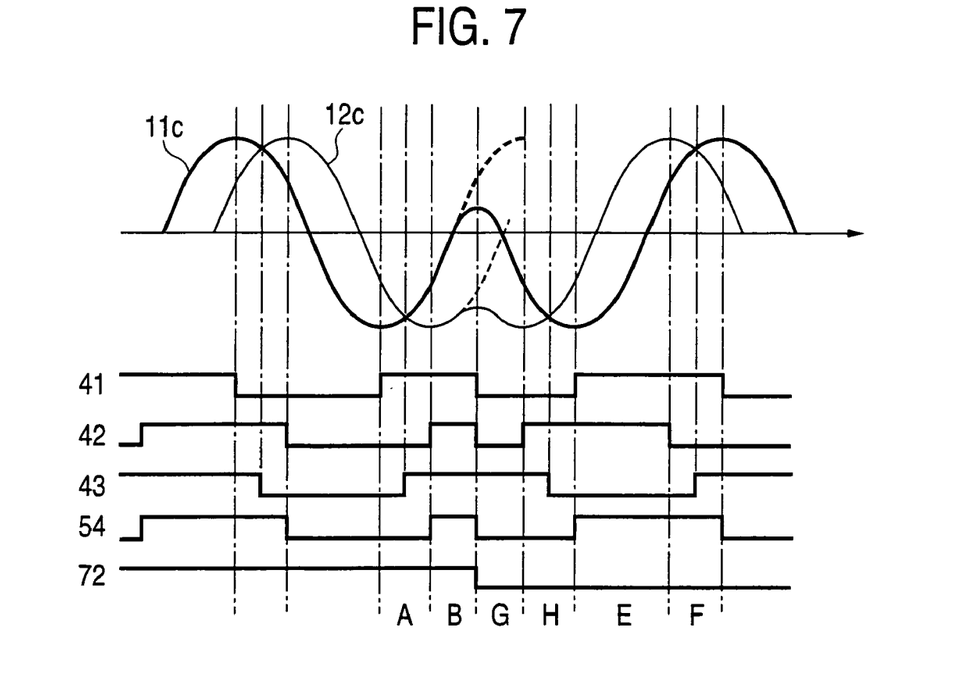
FIG. 7 is a waveform chart showing the outputs of the output terminals when the magnetic rotating body has shifted from forward rotation to backward rotation on different timing for FIG. 6 in the first preferred embodiment.

FIG. 6 shows the operation in the case of a shift to backward rotation in Mode "A". At this time, the center point voltage 11c changes from increasing to decreasing (the output of the output terminal 41 changes from "1" to "0"), the center point voltage 12c changes from decreasing to increasing (the output of the output terminal 42 changes from "0" to "1"), and because immediately after the change the center point voltage 11c is decreasing (the output of the output terminal 41 is "0") and the center point voltage 12c is increasing (the output of the output terminal 42 is "1"), reference is made to the output of the output terminal 54, and since it is "0", backward rotation (Mode "H") can be inferred, and the output of the output terminal 72 of the gate circuit 6 changes from "1" to "0", and thereafter it can be detected that it is backward rotation.

Next, operation in the case of shifting to backward rotation in Mode "B" will be described, with reference to FIG. 7. When there has been a shift to backward rotation in Mode "B", the center point voltage 11c changes from increasing to decreasing (the output of the output terminal 41 changes from "1" to "0"), the center point voltage 12c changes from increasing to decreasing (the output of the output terminal 42 changes from "1" to "0"), and because immediately after the change the center point voltage 11c is decreasing (the output of the output terminal 41 is "0") and the center point voltage 12c is decreasing (the output of the output terminal 42 is "0"), reference is made to the output of the output terminal 43, and since it is "1", backward rotation (Mode "G") can be inferred, the output terminal 72 of the gate circuit 6 changes from "1" to "0", and thereafter it can be detected that it is backward rotation. In the cases where a reversal takes place in Mode "C" or Mode "D" also, and also when the shift is from backward rotation to forward rotation, the operation is the same and so will not be described again here.

As described above, in this first preferred embodiment, because simultaneously with shifting from forward rotation to backward rotation or from backward rotation to forward rotation the reversal can be detected, and increasing/decreasing information of center point voltages are used, adjustment for device dispersion and offset is unnecessary.

Although in this first preferred embodiment the rotation direction is detected by the logic circuit 5 and the gate circuit 6, alternatively it are realized by a program of a microcomputer or the like on the basis of the outputs of the output terminals 41, 42 and the output of the output terminal 43. And the comparators 31, 32 and 33 may also be realized by means of a program of a microcomputer or the like. By using a program of a microcomputer or the like it is possible to reduce the scale of the circuitry.

Second Preferred Embodiment

Figure 9:
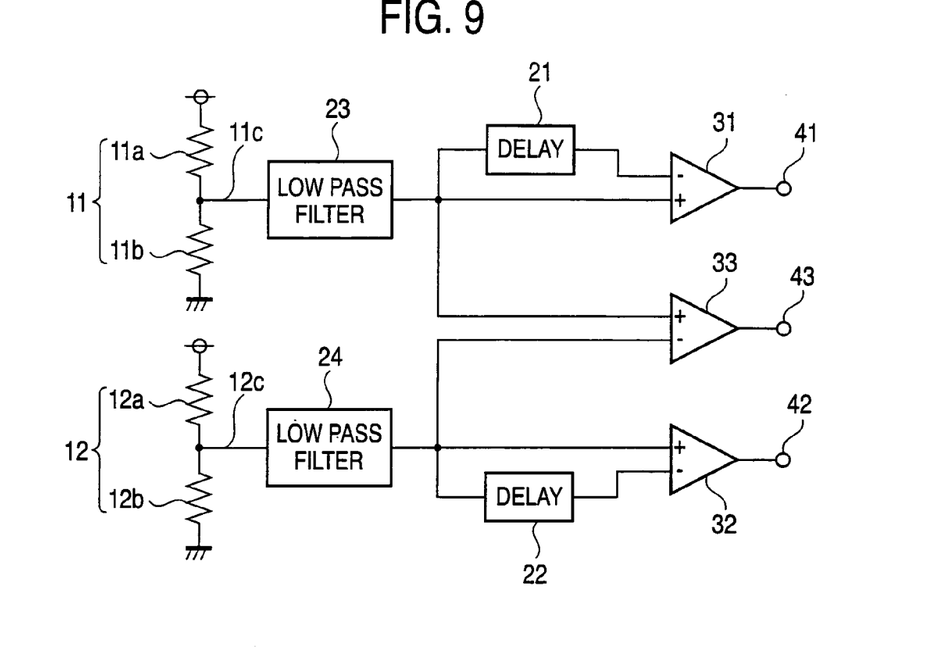
FIG. 9 is a block diagram showing a main part of a second preferred embodiment of a rotation state detecting device.

FIG. 9 is a block diagram showing a main part of a rotation state detecting device according to a second preferred embodiment. Comparators 31, 32 compare center point voltages 11c, 12c with the outputs of delay circuits 21, 22, but to prevent misoperation, respective low pass filters 23, 24 are inserted to remove a noise component from the signals being compared. In FIG. 9, a high-frequency noise component of the center point voltage 11c, 12c outputs is removed with low pass filters 23, 24, and the outputs of the low pass filters 23, 24 are compared with the outputs of delay circuits 21, 22 for delaying those outputs by the comparators 31, 32. Similarly, the outputs of the low pass filters 23, 24 are compared with each other by a comparator 33. As a result, because signals in which noise caused by external disturbances is removed from them are compared, misoperation caused by noise can be suppressed.

Although in this second preferred embodiment the outputs of the low pass filters 23, 24 and outputs obtained by delaying these outputs with the delay circuits 21, 22 were compared by the comparators 31, 32, alternatively outputs obtained by passing the center point voltages 11c, 12c through two low pass filters having different time constants may be compared with by the comparators 31, 32.

Third Preferred Embodiment

Figure 10:
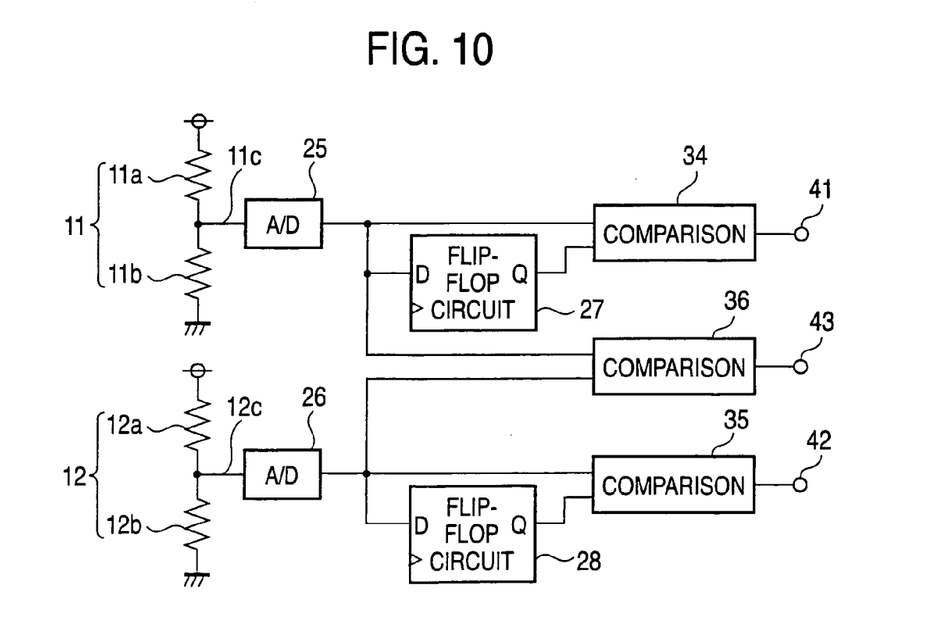
FIG. 10 is a block diagram showing a main part of a third preferred embodiment of a rotation state detecting device.

FIG. 10 is a block diagram showing a main part of a rotation state detecting device according to a third preferred embodiment. Whereas in the first preferred embodiment the increasing/decreasing directions of the center point voltages 11c, 12c were detected using delay circuits 21, 22 and comparators 31, 32, alternatively the analog values of the center point voltages 11c, 12c may be converted into digital values with A/D-convertors 25, 26, and these digital values (signals) may be delayed using flip-flop circuits 27, 28 to detect the increasing/decreasing direction. In FIG. 10, the A/D-convertors 25, 26 convert the analog values (signals) of the center point voltages 11c, 12c into digital values (signals). The flip-flop circuits 27, 28 delay the center point voltages 11c, 12c converted to digital values by 1 clock period.

Logic circuits 34, 35 compare the digital values of the center point voltages 11c, 12c (the outputs of the A/D-convertors 25, 26) with the digital values of the center point voltages 11c, 12c delayed by 1 clock period (the outputs of the flip-flop circuits 27, 28) and output corresponding logic values, and thus have the function of comparators. A logic circuit 36 compares the sizes of the digital values of the center point voltages 11c, 12c (the outputs of the A/D-convertors 25, 26) and outputs a corresponding logic value, and thus has the function of a comparator. By this digitalization it is possible to suppress misoperation caused by noise and the like.

Or, the outputs of the A/D-convertors 25, 26 may be inputted directly to a microcomputer or the like and both the delaying by 1 clock period and the comparison operations then realized by a program of the microcomputer.

While presently preferred embodiments of the present invention have been shown and described above, it is to be understood that these disclosures are for the purpose of illustration and that various changes and modifications may be made without departing from the scope of the invention as set forth in the appended claims.

What is claimed is:

1. A rotation state detecting device, comprising:
a magnet creating a bias field;
first and second bridge circuits disposed in the bias field of the magnet and facing a pronged magnetic rotating body constituting a detection object side by side in the rotation direction thereof, made up of magneto-resistance effect elements that undergo resistance changes caused by state changes of the bias field corresponding to rotation of the detection object;
a first comparator for detecting an increasing/decreasing direction of the center point voltage of the first bridge circuit (11) and outputting a corresponding logic value;
a second comparator for detecting an increasing/decreasing direction of the center point voltage of the second bridge circuit and outputting a corresponding logic value;
a third comparator for detecting a difference between the center point voltage of the first bridge circuit and the center point voltage of the second bridge circuit and outputting a corresponding logic value; and
logic value information deriving means for outputting "1" when the logic values of the outputs of the first comparator and the second comparator are both "1", outputting "0" when they are both "0", and continuing to output the previous value at other times,
wherein the direction of rotation of the detection object is determined on the basis of a combination of the outputs of the first, second and third comparators and the logic value information deriving means.

2. A rotation state detecting device according to claim 1, wherein the first and second comparators compare the center point voltages of the first and second bridge circuits with delayed outputs thereof to detect the increasing/decreasing directions of the center point voltages, and output logic values accordingly.

3. A rotation state detecting device according to claim 1, wherein the center point voltages of the first and second bridge circuits are outputted via low pass filters to suppress misoperation.

4. A rotation state detecting device according to claim 1, further comprising A/D-convertors for converting analog values of the center point voltages of the first and second bridge circuits to digital values, wherein the increasing/decreasing directions of the center point voltages of the first and second bridge circuits are detected by the digital value outputs of the A/D-convertors being compared with delayed outputs thereof, and logic values are outputted accordingly.

5. A rotation state detecting device according to claim 1, wherein the comparators or the logic value information deriving means are provided as a microcomputer.

6. A rotation state detecting method wherein the direction of rotation of an object of detection is determined using a rotation state detecting device according to claim 1.

* * * * *